US010989785B2

(12) United States Patent
Satou

(10) Patent No.: US 10,989,785 B2
(45) Date of Patent: Apr. 27, 2021

(54) POSITION DETERMINATION APPARATUS, POSITION DETERMINATION SYSTEM, AND COMPUTER PROGRAM PRODUCT

(71) Applicant: FUJITSU CLIENT COMPUTING LIMITED, Kanagawa (JP)

(72) Inventor: Keita Satou, Kawasaki (JP)

(73) Assignee: FUJITSU CLIENT COMPUTING LIMITED, Kanagawa (JP)

(*) Notice: Subject to any disclaimer, the term of this patent is extended or adjusted under 35 U.S.C. 154(b) by 0 days.

(21) Appl. No.: 16/751,709

(22) Filed: Jan. 24, 2020

(65) Prior Publication Data
US 2020/0264259 A1  Aug. 20, 2020

(30) Foreign Application Priority Data
Feb. 20, 2019  (JP) .............................. JP2019-028616

(51) Int. Cl.
    H04W 24/00    (2009.01)
    G06F 15/173   (2006.01)
    G01S 5/02     (2010.01)
    H04W 84/18    (2009.01)
    H04W 40/02    (2009.01)
(52) U.S. Cl.
    CPC ............... *G01S 5/02* (2013.01); *H04W 40/02* (2013.01); *H04W 84/18* (2013.01)
(58) Field of Classification Search
    CPC .......... G01S 5/02; H04W 40/02; H04W 84/18
    USPC ..................................................... 455/456.3
    See application file for complete search history.

(56) References Cited

U.S. PATENT DOCUMENTS

| 9,915,723 | B1* | 3/2018 | Nunez ................... H04W 4/025 |
| 2014/0285324 | A1* | 9/2014 | Austin ................... G01S 13/84 340/10.3 |
| 2015/0172868 | A1* | 6/2015 | Kang .................... H04W 4/029 455/456.1 |
| 2016/0192152 | A1* | 6/2016 | Taylor ................ G01C 21/3626 455/456.3 |
| 2017/0251066 | A1* | 8/2017 | Lawrenson ............. H04L 67/16 |
| 2019/0306790 | A1* | 10/2019 | Kottontavida .... H04W 72/1252 |

FOREIGN PATENT DOCUMENTS

| JP | H04260228 A | 9/1992 |
| JP | 2007221541 A | 8/2007 |
| JP | 2008312227 A | 12/2008 |

OTHER PUBLICATIONS

Office Action issued in corresponding Japanese Patent Application No. 2019-028616, dated May 12, 2020 (3 pages).

* cited by examiner

*Primary Examiner* — Mark G. Pannell
(74) *Attorney, Agent, or Firm* — Osha Bergman Watanabe & Burton LLP

(57) ABSTRACT

A position determination apparatus includes a memory and a hardware processor coupled to the memory. The hardware processor: determines position information on one or more wireless communication devices being located within a target region; judges position movement of the one or more wireless communication devices based on the position information; and transmits, to the wireless communication device whose position movement has been judged to be absent, a decrease instruction signal that causes the wireless communication device to decrease a communication frequency of the wireless communication device.

6 Claims, 7 Drawing Sheets

| TAG ID | POSITION INFOR-MATION | PRESENCE/ ABSENCE OF POSITION MOVEMENT | COMMUNI-CATION FREQUENCY ID | DECREASE INSTRUCTION SIGNAL TRANSMISSION TIME |
|---|---|---|---|---|
| 01 | xxx | ABSENCE | a | yy/yy/yyy |
| 02 | xxx |  | a | yy/yy/yyy |
| 05 | xxx | ABSENCE | b | yy/yy/yyy |
| ⋮ | | | | |

| COMMUNI-CATION FREQUENCY ID | COMMUNICATION FREQUENCY |
|---|---|
| a | ONCE EVERY 1,024 ms |
| b | ONCE EVERY 10 ms |
| c | ONCE EVERY 60 s |
| ⋮ | |
| z | INITIAL VALUE (ONCE EVERY 512 ms) |

POSITION DETERMINATION APPARATUS, POSITION DETERMINATION SYSTEM, AND COMPUTER PROGRAM PRODUCT

CROSS-REFERENCE TO RELATED APPLICATIONS

This application is based upon and claims the benefit of priority from Japanese Patent Application No. 2019-028616, filed Feb. 20, 2019, the entire contents of which are incorporated herein by reference.

FIELD

Embodiments described herein relate to a position determination apparatus, a position determination system, and a computer program product.

BACKGROUND

Systems for determining positions of portable wireless communication devices have been known. For example, there is a system for determining a position of a wireless communication device by receiving a wireless signal used for determining a position from a wireless communication device that has received a signal transmitted from a wireless station. Furthermore, there is a radio frequency identification (RFID) system including a plurality of observation devices and a plurality of wireless communication devices.

Conventionally, the communication frequency of a wireless communication device is set to a predetermined fixed value. Conventionally, the communication frequency of the wireless communication device is physically changed by manipulating a switch mounted on a substrate or a casing of the wireless communication device. The wireless communication device continues to communicate at the physically set communication frequency, so that it is difficult to reduce power consumption.

SUMMARY

A position determination apparatus according to an embodiment of the present disclosure includes a memory and a hardware processor coupled to the memory. The hardware processor is configured to: determine position information on one or more wireless communication devices being located within a target region; judge position movement of the one or more wireless communication devices based on the position information; and transmit, to the wireless communication device whose position movement has been judged to be absent, a decrease instruction signal that causes the wireless communication device to decrease a communication frequency of the wireless communication device.

BRIEF DESCRIPTION OF THE DRAWINGS

FIG. 3A is a schematic diagram illustrating an example of a data configuration of region management information according to the embodiment;

FIG. 3B is a diagram illustrating an example of a data configuration of communication frequency management information according to the embodiment;

DETAILED DESCRIPTION

According to embodiments of the present disclosure, it is capable of reducing power consumption in a wireless communication device.

Exemplary embodiments of the present disclosure are disclosed below. Configurations in the embodiments described below and functions and effects provided by the configurations are illustrative. The following embodiments are not intended to limit the disclosed technology.

Figure 1:
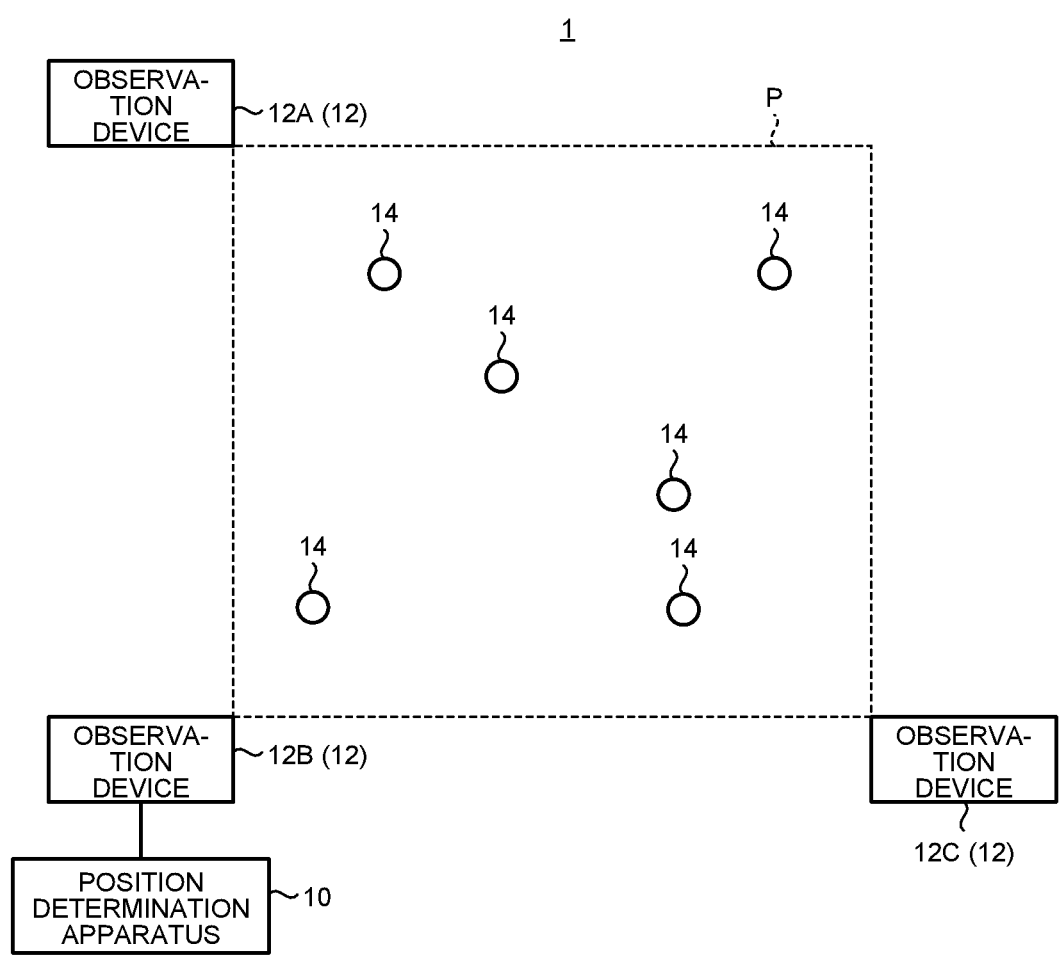
FIG. 1 is a schematic diagram illustrating an example of a position determination system according to an embodiment.

FIG. 1 is a schematic diagram illustrating an example of a position determination system 1 according to the present embodiment.

The position determination system 1 includes a position determination apparatus 10, one or more observation devices 12, and one or more wireless communication devices 14. The position determination apparatus 10 and each of the observation devices 12 are communicably connected in a wired or wireless manner.

The position determination apparatus 10 is configured to determine a position of each wireless communication device 14 that is located within a target region P.

The target region P may be a region determined in advance. In the present embodiment, the target region P is a target region where the observation devices 12 communicate with a wireless communication device 14 in a wireless manner. The shape and the size of the target region P are not limited. The target region P may be a region within a predetermined range, such as a building, a space in a building, and a room.

The observation device 12 transmits various kinds of signals to the wireless communication devices 14 located within the target region P. The observation device 12 receives wireless signals from the wireless communication devices 14 within the target region P. In other words, the observation device 12 functions as a transceiver that transmits signals to the wireless communication devices 14 within the target region P and also as a receiver that receives wireless signals from the wireless communication devices 14 within the target region P.

In the present embodiment, the position determination system 1 includes three observation devices 12 (observation device 12A to observation device 12C) as an example. The number of the observation devices 12 included in the position determination system 1 is not limited to three. In the case where the wireless communication device 14 and the position determination apparatus 10 can directly communicate with each other in a wireless manner, the observation device 12 may be omitted. In the present embodiment, a configuration in which the position determination apparatus 10 communicates with the wireless communication device 14 via the observation device 12 in a wireless manner is described as an example. In other words, the present embodiment assumes that the communication between the position determination apparatus 10 and the wireless communication device 14 is performed via the observation device 12.

The wireless communication device 14 is a movable wireless communication device. For example, the wireless communication device 14 can move its position by being carried by or mounted to a target such as a user and an article. The wireless communication device 14 is sometimes referred to as a "tag". The wireless communication device 14 executes processing such as communication by using power charged in advance or power supplied from a battery.

The wireless communication device 14 communicates at a frequency corresponding to a preset communication frequency. For example, the wireless communication device 14 has a function of performing communication by Bluetooth (registered trademark), and transmits and receives wireless signals based on the wireless communication standard such as Bluetooth Low Energy (BLE). The wireless communication standard used by the wireless communication device 14 is not limited to the form using Bluetooth. For example, the wireless communication device 14 may perform wireless communication by using the infrared communication standard such as Infrared Data Association (IrDA).

The wireless communication device(s) 14 may transmit a wireless signal directly to the observation device 12, or may transmit a wireless signal to the observation device 12 by multi-hop wireless communication. When the wireless signal is transmitted to the observation device 12 by multi-hop wireless communication, the wireless communication devices 14 relays a wireless signal from one to another, thereby transferring the wireless signal to the observation device 12. The observation device 12 outputs the received wireless signal to the position determination apparatus 10.

The position determination apparatus 10 determines the position of the wireless communication device 14 and sets the communication frequency by using a wireless signal received from the wireless communication device 14 via the observation devices 12 (the observation device 12A to the observation device 12C) (details are described later).

Next, the functional configuration of the position determination system 1 will be described.

Figure 2:
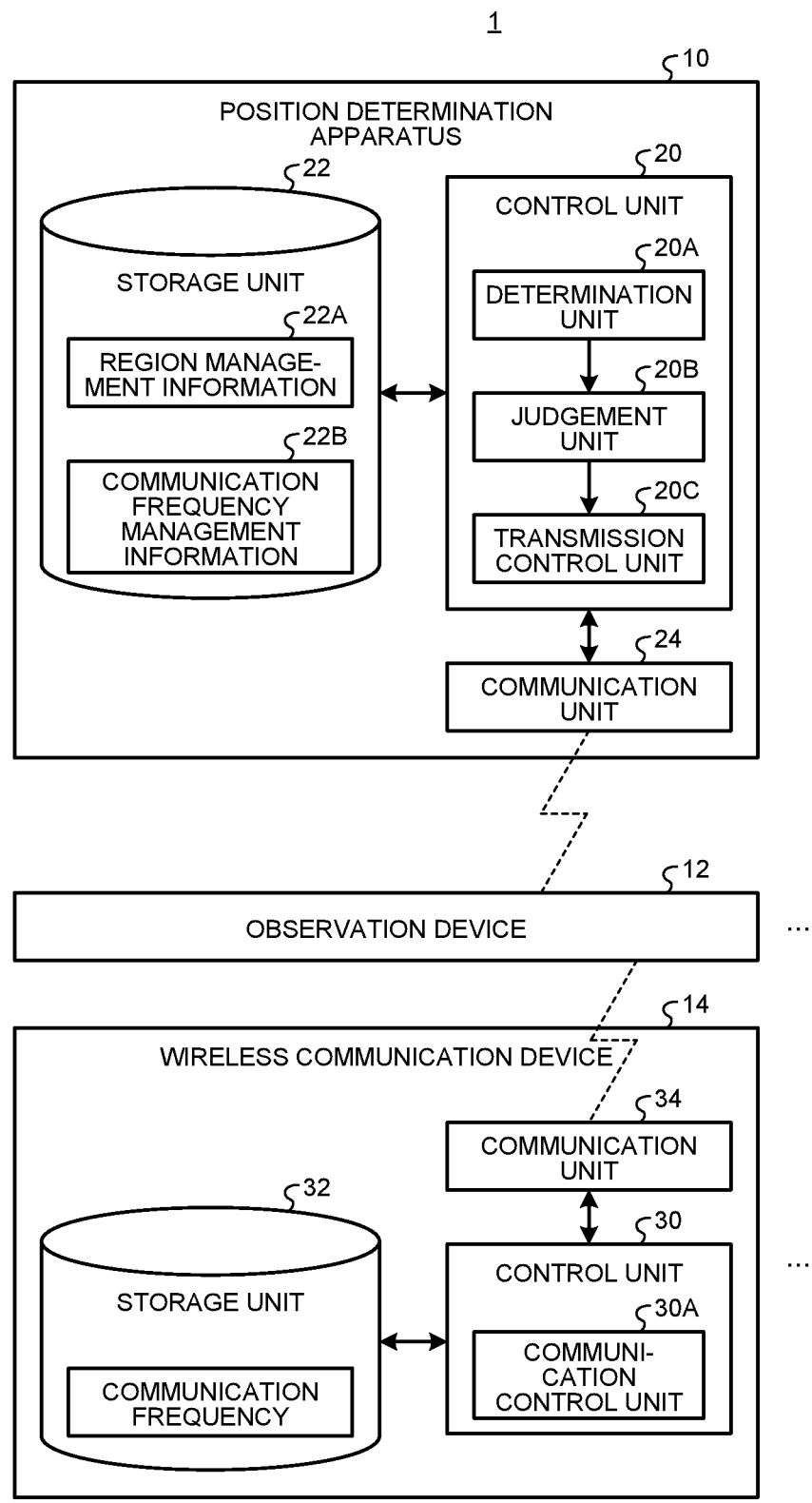
FIG. 2 is a functional block diagram of the position determination system according to the embodiment.

FIG. 2 is an example of a functional block diagram of the position determination system 1.

First, the position determination apparatus 10 will be described.

The position determination apparatus 10 includes a control unit 20, a storage unit 22, and a communication unit 24. The control unit 20, the storage unit 22, and the communication unit 24 are connected so as to exchange data or signals.

The storage unit 22 stores various kinds of information. In the present embodiment, the storage unit 22 stores region management information 22A and communication frequency management information 22B. Details of the information will be described later. The storage unit 22 is a known storage medium, such as a hard disk drive (HDD). The storage unit 22 may be provided in an external device.

The communication unit 24 is a communication interface for communicating with the observation device 12. The communication unit 24 may be a communication interface for communicating with the observation device 12 and the wireless communication device 14. The "communication" is a general expression of transmission and reception.

The control unit 20 includes a determination unit 20A, a judgement unit 20B, and a transmission control unit 20C.

Each of the above-mentioned units is implemented by, for example, one or more hardware processors. For example, each of the above-mentioned units may be implemented by causing a hardware processor, such as a central processing unit (CPU), to execute a computer program, that is, implemented by software. Each of the above-mentioned units may be implemented by a hardware processor such as a dedicated integrated circuit (IC), that is, implemented by hardware. Each of the above-mentioned units may be implemented by a combination of software and hardware. In the case where hardware processors are used, each processor may implement one of the units or may implement two or more of the units.

The determination unit 20A determines position information on one or more wireless communication devices 14 that are located within the target region P.

It is assumed that the wireless communication device 14 transmits a wireless signal directly to the observation device 12. In this case, the determination unit 20A receives, from the observation device 12, a wireless signal including received signal strength indication (RSSI) of radio waves received from the wireless communication device 14 and an ID of the wireless communication device 14 that is a transmission source of the radio waves.

In this case, the determination unit 20A may determine, by using a known method, position information on the wireless communication device 14 based on the received signal strength indication included in the wireless signal received from the observation device 12. The determination unit 20A may determine, by using a known method, position information on the wireless communication device 14, which is a transmission source, based on the received signal strength indication included in the wireless signal transmitted from the wireless communication device 14, which is received from each of a plurality of the observation device 12A to the observation device 12C. The determination unit 20A may store in advance position information on a plurality of observation devices 12 (observation device 12A to observation device 12C) for observing the target region P, and determine position information on the wireless communication device 14 by using the position information.

It is assumed that the wireless communication devices 14 transmit a wireless signal to the observation device 12 by multi-hop wireless communication. In this case, each of the wireless communication devices 14, to a next wireless communication device 14, transmits a wireless signal including hop number information representing the number of hops from the first transmission source by multi-hop wireless communication. The wireless communication device 14 increments the hop number information included in the received wireless signal by "1" and transmits the hop number information to a next wireless communication device 14 by multi-hop wireless communication. Thus, the observation device 12A to the observation device 12C each receive the wireless signal including hop number information from the wireless communication device 14 as a transmission source.

Subsequently, the determination unit 20A generates, based on a distance between the wireless communication devices 14 and the number of hops included in the wireless signal, an arc that is originated from each of the observation device 12A to the observation device 12C and has a radius corresponding to the estimated distance to the wireless communication device 14 as a transmission source from each of the observation device 12A to the observation device 12C. Position information on the observation device 12A to the observation device 12C may be stored in the position determination apparatus 10 in advance. The distance between the wireless communication devices 14 may be derived by using a known method. The determination unit 20A determines the center of gravity of intersections of a plurality of the arcs as position information on the wireless communication device 14 as a transmission source.

The determination unit 20A registers the determined position information in the region management information 22A in association with identification information on the wireless communication device 14 of a transmission source of the wireless signal used for determining the position information.

FIG. 3A is a schematic diagram illustrating an example of the data configuration of the region management information 22A.

In the region management information 22A, a tag ID, position information, information on presence/absence of position movement, a communication frequency ID, and a decrease instruction signal transmission time are associated with one another. The data form of the region management information 22A is not limited. The data form of the region management information 22A may be a table or a database.

The tag ID is identification information on a wireless communication device 14 being a transmission source of a wireless signal. The position information included in the region management information 22A represents the position of a wireless communication device 14 identified by a corresponding tag ID. The information on presence/absence of position movement represents whether the position of a wireless communication device 14 identified by a corresponding tag ID has moved. In the following, the determination that position movement is present is sometimes referred to as "presence of position movement", and the determination that position movement is absent is sometimes referred to as "absence of position movement".

The communication frequency ID is identification information on a communication frequency that is currently set in a wireless communication device 14 identified by a corresponding tag ID. The decrease instruction signal transmission time indicates a time at which a decrease instruction signal (described later) was transmitted last time.

The determination unit 20A registers the determined position information in the region management information 22A in association with a tag ID included in a wireless signal used for determining the position information. The tag ID may be included in the wireless signal. That is, the wireless signal transmitted by the wireless communication device 14 includes the tag ID that is identification information on the wireless communication device 14 as a transmission source. The determination unit 20A may determine a tag ID of the wireless communication device 14 as a transmission source by reading a tag ID included in the wireless signal and register the tag ID in the region management information 22A.

Returning to FIG. 2, the description is continued. The judgement unit 20B judges, based on the position information determined by the determination unit 20A, the position movement of the wireless communication device 14 whose position information has been determined.

The judgement unit 20B judges the position movement by using, for example, the determined position information and the region management information 22A.

Specifically, the judgement unit 20B judges whether the position information determined by the determination unit 20A matches position information, which is registered in the region management information 22A and corresponds to a tag ID included in the wireless signal used for determining the position information by the determination unit 20A. The case where the pieces of position information match each other refers to a state that position information currently determined by the determination unit 20A and position information previously determined by the determination unit 20A match each other, and that the wireless communication device 14 has not moved its position. Thus, the judgement unit 20B judges that the position movement is absent when the pieces of position information match each other, and judges that the position movement is present when the pieces of position information do not match each other.

The transmission control unit 20C transmits a decrease instruction signal that causes the wireless communication device 14, whose position movement has been judged to be absent by the judgement unit 20B, to decrease the communication frequency of this wireless communication device 14. The decrease instruction signal may be a signal for instructing the decrease in communication frequency by representing a communication frequency lower than the current communication frequency.

The decrease instruction signal includes, for example, a value indicating a communication frequency resulted from the decrease.

The transmission control unit 20C transmits the decrease instruction signal by using the region management information 22A and the communication frequency management information 22B.

FIG. 3B is a diagram illustrating an example of the data configuration of the communication frequency management information 22B. The communication frequency management information 22B associates a communication frequency ID and a communication frequency with each other. The communication frequency ID is identification information on the communication frequency. A communication frequency ID corresponding to each of gradually decreasing communication frequencies and a communication frequency ID corresponding to an initial value are registered in advance as the communication frequency management information 22B.

The initial value indicates a communication frequency. In an example illustrated in FIG. 3B, a communication frequency indicating "once every 512 ms" is registered in advance as the initial value, and a communication frequency ID "z" is registered in advance for the initial value. The communication frequency as the initial value may be at least a communication frequency at which the wireless communication device 14 can execute normal wireless communication. Specifically, the communication frequency serving as an initial value may be a communication frequency higher than the lowest communication frequency registered in the communication frequency management information 22B.

The transmission control unit 20C reads a communication frequency ID in the region management information 22A, which corresponds to a tag ID of a wireless communication device 14 to which the decrease instruction signal is to be transmitted. Through this processing, the transmission control unit 20C reads the communication frequency ID of the communication frequency currently set in the wireless communication device 14. Then, the transmission control unit 20C reads, from the communication frequency management information 22B, a communication frequency lower than a communication frequency identified by the read communication frequency ID.

Subsequently, the transmission control unit 20C transmits a decrease instruction signal including the read communication frequency to the wireless communication device 14 whose position movement has been judged to be absent. The transmission control unit 20C registers a communication frequency ID corresponding to the communication frequency included in the transmitted decrease instruction signal and a transmission time of the decrease instruction signal in the region management information 22A in association with a tag ID of the wireless communication device 14 to which the decrease instruction signal has been transmitted. As a result, the communication frequency ID of the communication frequency currently set in the wireless communication device 14 and the decrease instruction signal transmission time including the communication frequency identified by the communication frequency ID are registered in the region management information 22A.

For example, it is assumed that a communication frequency identified by a communication frequency ID registered in the region management information 22A and corresponding to a tag ID of a wireless communication device 14 whose position movement has been judged to be absent is "once every 1024 ms". In this case, the transmission control unit 20C transmits, to the wireless communication device 14, a decrease instruction signal including a communication frequency (for example, "once every 60s") that is lower than the current communication frequency ("once every 1024 ms"). At this time, the position determination apparatus 10 may directly transmit the decrease instruction signal to a target wireless communication device 14, or may transmit the decrease instruction signal to a target wireless communication device 14 via the observation device 12.

The transmission control unit 20C updates the current communication frequency ID in the region management information 22A, which corresponds to the tag ID of the wireless communication device 14, to a communication frequency ID "c" corresponding to the communication frequency "once every 60s". The transmission control unit 20C registers, in the region management information 22A, a transmission time of the decrease instruction signal as a decrease instruction signal transmission time. Thus, in the region management information 22A, the communication frequency currently set in the wireless communication device 14 and the transmission time at which the decrease instruction signal was transmitted last time (immediately before) are registered for each tag ID.

Returning to FIG. 2, the description is continued. The transmission control unit 20C may transmit a decrease instruction signal representing a gradual decrease of the communication frequency to a wireless communication device 14 that has been determined to have not moved its position.

For example, in a case where it is determined that a wireless communication device 14 has not moved its position when a predetermined time elapsed after the transmission control unit 20C transmitted a decrease instruction signal to the wireless communication device 14 last time, the transmission control unit 20C transmits, to the wireless communication device 14, a decrease instruction signal including a communication frequency lower than the previous one. The transmission control unit 20C may repeatedly execute this processing. By performing this processing, the transmission control unit 20C can output a decrease instruction signal representing a gradual decrease of the communication frequency to the wireless communication device 14 determined to have not moved its position.

The transmission control unit 20C may transmit to the wireless communication device 14 a decrease instruction signal including an instruction to decrease the communication frequency in place of including a decreased communication frequency.

Meanwhile, the wireless communication device 14 may move its position after a decrease instruction signal is transmitted to this wireless communication device 14 due to the determination that the position movement is absent. In this case, when the wireless communication device 14 is determined to have moved its position, the transmission control unit 20C may transmit, to the wireless communication device 14, an initial value instruction signal that causes the wireless communication device 14 to return the communication frequency to the initial value.

Specifically, the transmission control unit 20C reads a communication frequency indicating the initial value from the communication frequency management information 22B. In the case of the example illustrated in FIG. 3B, the transmission control unit 20C reads "once every 512 ms" being the initial value from the communication frequency management information 22B. The transmission control unit 20C may transmit an initial value instruction signal including a communication frequency indicating the read initial value ("once every 512 ms") to a wireless communication device 14 determined to have moved its position after the transmission control unit 20C transmits a decrease instruction signal last time.

There may be a case where a plurality of wireless communication devices 14 are present within a target region P and the judgement unit 20B judges that the positions of all the wireless communication devices 14 have not moved. In this case, the transmission control unit 20C may transmit the decrease instruction signal to all the wireless communication devices 14 within the target region P.

For example, it is assumed that all pieces of position movement information ("presence/absence of position movement" in FIG. 3A), which correspond to all tag IDs registered in the region management information 22A, indicate that the positions have "not" moved. In this case, the transmission control unit 20C may determine that the positions of all wireless communication devices 14 present within the target region P have not moved. The transmission control unit 20C may transmit a decrease instruction signal to all wireless communication devices 14 registered in the region management information 22A.

Alternatively, the transmission control unit 20C may transmit the decrease instruction signal to all the wireless communication devices 14 within the target region P when it is determined that the positions of all wireless communication devices 14 within a target region P have not moved and at least one of first and second conditions is satisfied. The first condition is a condition where it is determined that the number of the wireless communication devices 14 within the target region P has neither increased nor decreased. The second condition is a condition where it is determined that at least part of the wireless communication devices 14 within the target region P has not been replaced.

In this case, the transmission control unit 20C determines whether position movement information ("presence/absence of position movement" in FIG. 3A) indicates that the position has "not" moved. The position movement information represents whether the position has moved or not and corresponds to each of all tag IDs registered in the region management information 22A. When all pieces of the position movement information indicate that the position has "not" moved, the transmission control unit 20C determines the number of tag IDs and a list of the tag IDs when all pieces of the position movement information indicated that the position has "not" moved before a predetermined time.

The control unit 20 may delete fields (fields of tag ID, and position information, presence/absence of position movement, communication frequency ID, and decrease instruction signal transmission time corresponding to the tag ID) in the region management information 22A corresponding to a tag ID that has not been updated for a predetermined period or more since this tag ID was registered in the region management information 22A from the region management information 22A. The longest period for determining whether the wireless communication device 14 has been continuously present within the target region P may be set as the predetermined period.

Each time when all pieces of the position movement information registered in the region management information 22A become "absence", the control unit 20 registers the following: a timing (or a time point) at which all pieces of the position movement information representing presence/absence of position movement become "absence"; the number of tag IDs registered in the region management information 22A; and a list of the tag IDs in the storage unit 22.

The transmission control unit 20C compares the number (total number) of tag IDs registered in the region management information 22A when all pieces of the position movement information become "absence" at this time with the number (total number) of tag IDs when all pieces of the position movement information were judged to be "absence" last time. When the numbers of the tag IDs match each other, the transmission control unit 20C determines that the number of the wireless communication devices 14 within the target region P has "not" increased or decreased. When the numbers of the tag IDs do not match each other, the transmission control unit 20C may determine that the number of the wireless communication devices 14 within the target region P has increased or decreased.

The control unit 20 compares a list of the tag IDs registered in the region management information 22A when all pieces of the position movement information in the region management information 22A become "absence" at this time with a list of the tag IDs when all pieces of the position movement information were judged to be "absence" last time. When all tag IDs indicated in the lists of the tag IDs match each other, the transmission control unit 20C determines that the wireless communication devices 14 within the target region P have not been replaced. When at least part of the lists of the tag IDs do not match each other, the transmission control unit 20C may determine that at least part of the wireless communication devices 14 within the target region P have been replaced.

Then, the transmission control unit 20C may transmit a decrease instruction signal to all wireless communication devices 14 within the target region P when it is determined that the position movement of all the wireless communication devices 14 within the target region P is absent and at least one of the first and second conditions described above is satisfied.

There may be a case where all wireless communication devices 14 located within the target region P need to be forcibly switched to a low power consumption mode.

In this case, for example, the transmission control unit 20C may transmit a switch instruction signal to all the wireless communication devices 14 within the target region P when the current time has reached a predetermined time. Whether the current time has reached the predetermined time may be judged by, for example, the judgement unit 20B.

The switch instruction signal includes a switch instruction to switch from the normal mode to the low power consumption mode, and includes a resume instruction to resume the normal mode when an activation scheduled time has come after the normal mode is switched to the low power consumption mode.

The low power consumption mode is a mode in which power consumption is lower than in the normal mode. In the wireless communication device 14, the mode can be switched between the normal mode with predetermined power consumption and the low power consumption mode with power consumption lower than that in the normal mode. The low power consumption mode is sometimes called "low power mode", "standby mode", or "sleep mode". The low power consumption mode is only required to be a mode in which power consumption is lower than that in the normal mode. When it is possible to set a plurality of modes that gradually represents the low power consumption state, any of these modes can be used.

The activation scheduled time may be set by the transmission control unit 20C. The activation scheduled time may be a timing after the transmission timing of the switch instruction signal.

Next, the functions of the wireless communication device 14 will be described.

The wireless communication device 14 includes a control unit 30, a storage unit 32, and a communication unit 34. The control unit 30, and the storage unit 32 and the communication unit 34 are connected so as to exchange data or signals.

The storage unit 32 stores various kinds of information. In the present embodiment, the storage unit 32 stores the communication frequency 32A. The storage unit 32 is a known storage medium.

The communication unit 34 is a communication interface for communicating with another device. The communication unit 34 is a communication interface for performing wireless communication with at least one of the observation device 12, other wireless communication devices 14, and the position determination apparatus 10.

The control unit 30 includes a communication control unit 30A.

The communication control unit 30A is implemented by, for example, one or more hardware processors. For example, the communication control unit 30A may be implemented by causing a hardware processor such as a CPU to execute a computer program, that is, by software. The communication control unit 30A may be implemented by a hardware processor such as a dedicated IC, that is, implemented by hardware. The communication control unit 30A may be implemented by a combination of software and hardware.

The communication control unit 30A communicates with another device at a communication frequency stored in the storage unit 32. Communication refers to both of reception of various kinds of signals from other devices (the position determination apparatus 10, the observation device 12, and the wireless communication device 14) and transmission of wireless signals to those other devices.

For example, the communication control unit 30A receives a signal transmitted from the observation device 12 at a communication frequency stored in the storage unit 32. The communication control unit 30A transmits a wireless signal that has been transmitted from a wireless communication device 14 having the communication control unit 30A mounted thereon at a communication frequency stored in the storage unit 32. In this case, the communication control unit 30A transmits a wireless signal including a tag ID that identifies the wireless communication device 14 having the communication control unit 30A mounted thereon. As described above, when the wireless communication device 14 performs communication by multi-hop wireless communication, the communication control unit 30A transmits or relays a wireless signal further including the number of hops.

In the present embodiment, the communication control unit 30A receives the decrease instruction signal, the initial value instruction signal, or the switch instruction signal from the position determination apparatus 10 via the observation device 12.

The case where the communication control unit 30A receives the decrease instruction signal will be described. When the communication control unit 30A receives the decrease instruction signal, the communication control unit 30A stores a communication frequency included in the decrease instruction signal in the storage unit 32. Specifically, the communication control unit 30A updates (or overwrites) a communication frequency stored in the storage unit 32 to the communication frequency included in the received decrease instruction signal. Through this processing, the communication control unit 30A sets the communication frequency included in the received decrease instruction signal as a communication frequency used for subsequent communication.

Thus, after that, the communication control unit 30A communicates with another device at a communication frequency lower than that before the decrease instruction signal is received. As the communication frequency becomes higher, power consumption in the wireless communication device 14 becomes higher. As the communication frequency becomes lower, power consumption in the wireless communication device 14 becomes lower. Thus, the wireless communication device 14 whose position movement has been judged to be absent can reduce power consumption as compared with before the decrease instruction signal is received.

As described above, when the position movement is judged to be absent again at a timing when a predetermined time elapsed after the wireless communication device 14 received a decrease instruction signal last time, the wireless communication device 14 receives a decrease instruction signal including a communication frequency lower than the previous one.

Thus, the communication control unit 30A changes the setting of communication frequency so as to be gradually lower as the time during which the absent state of the position movement continues becomes longer. Consequently, the wireless communication device 14 whose position movement has been judged to be absent can gradually reduce the power consumption as the period during which the position movement is continuously judged to be absent becomes longer.

As described above, there may be a case where the transmission control unit 20C transmits a decrease instruction signal including a decrease instruction of the communication frequency to the wireless communication device 14 in place of including the decreased communication frequency. In this case, when the decrease instruction signal is received, the communication control unit 30A in the wireless communication device 14 may execute processing for overwriting the communication frequency stored in the storage unit 32 with a communication frequency lower than the communication frequency. In view of reduction in processing load and reduction in power consumption in the wireless communication device 14, the position determination apparatus 10 may transmit the decrease instruction signal including the decreased communication frequency to the wireless communication device 14.

Next, the case where an initial value instruction signal is received will be described. When the communication control unit 30A receives an initial value instruction signal, the communication control unit 30A stores in the storage unit 32 a communication frequency of an initial value included in the initial value instruction signal. Specifically, the communication control unit 30A updates a communication frequency stored in the storage unit 32 to the communication frequency included in the newly received initial value instruction signal.

Through this processing, the communication control unit 30A can set subsequent communication frequencies to the communication frequency indicating the initial value. Thus, the wireless communication device 14 whose position movement has been judged to be present after it is determined that the position movement is absent can communicate at a communication frequency corresponding to the initial value instruction signal after decreasing the communication frequency in accordance with the decrease instruction signal. Consequently, the wireless communication device 14 can operate with low power consumption in the state where the position movement is absent, and after the position movement is restarted, can operate with power consumption that is capable of executing normal wireless communication.

Next, the case where the communication control unit 30A receives the switch instruction signal will be described. When the switch instruction signal is received, the communication control unit 30A switches from a normal mode to a low power consumption mode. Thus, the wireless communication device 14 that has received the switch instruction signal has power consumption lower than that in the normal mode.

The communication control unit 30A resumes from the low power consumption mode to the normal mode when the current time has reached an activation scheduled time included in the switch instruction signal.

Thus, the wireless communication device 14, which has received the switch instruction signal, is in a state of reducing power consumption until the current time has reached the activation scheduled time included in the switch instruction signal from the reception of the switch instruction signal. Consequently, the position determination apparatus 10 can reduce power consumption of the wireless communication device 14.

Next, the flow of information processing executed by the position determination apparatus 10 will be described.

Figure 4:
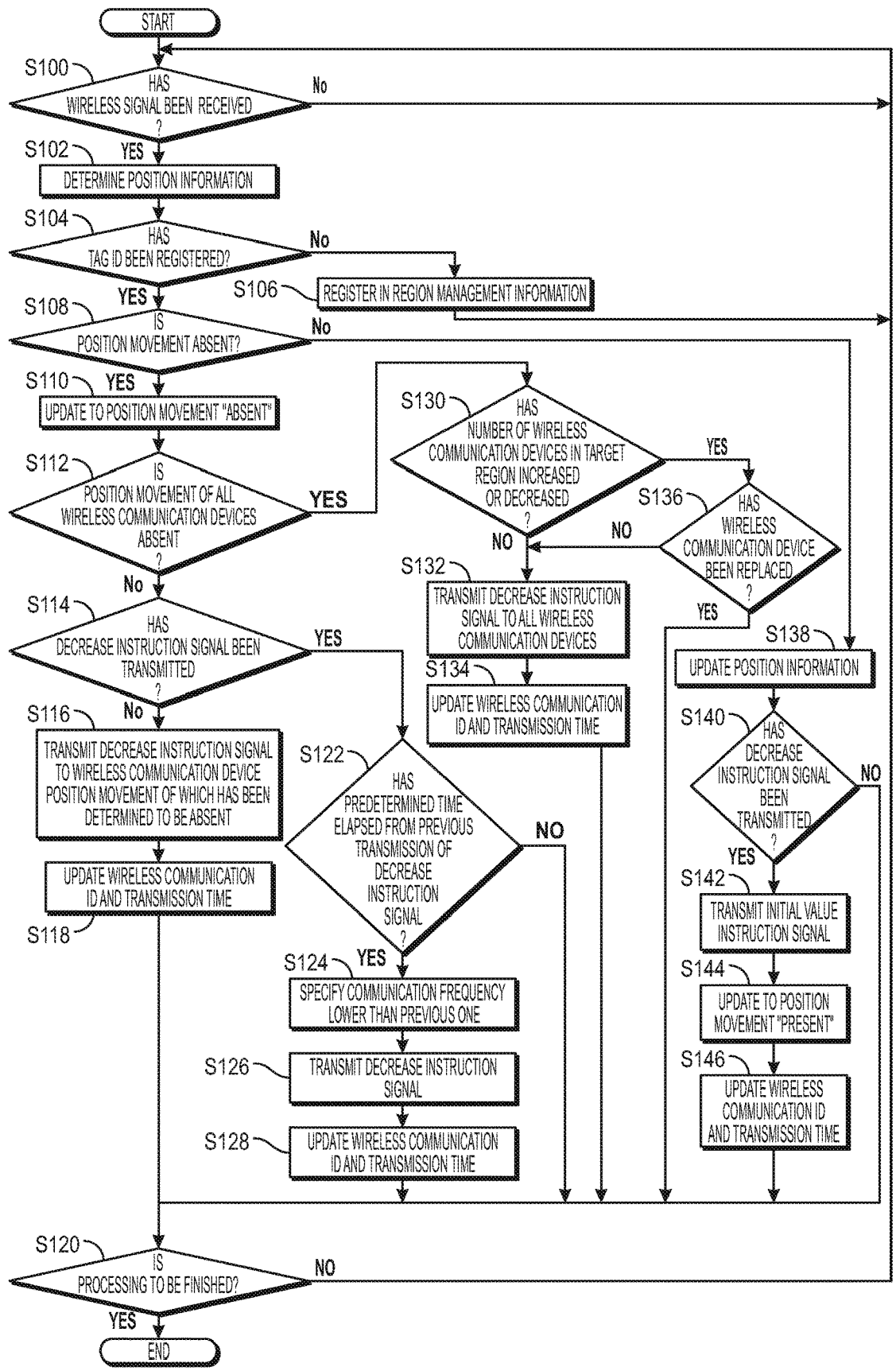
FIG. 4 is a flowchart illustrating an example of the flow of information processing according to the embodiment.

FIG. 4 is a flowchart illustrating an example of the flow of information processing executed by the position determination apparatus 10.

The determination unit 20A determines whether a wireless signal transmitted from the wireless communication device 14 has been received from the observation device 12 (Step S100). The determination unit 20A repeats negative determination (No at Step S100) until positive determination is made at Step S100 (Yes at Step S100).

When the determination unit 20A makes positive determination at Step S100 (Yes at Step S100), the processing proceeds to Step S102. At Step S102, the determination unit 20A, by using the wireless signal received at Step S100, position information on the wireless communication device 14 that is a transmission source of the wireless signal (Step S102).

Next, the determination unit 20A determines whether a tag ID of the wireless communication device 14, whose position information has been determined at Step S102, has already been registered in the region management information 22A (Step S104). The determination unit 20A performs the determination at Step S104 by determining whether the tag ID included in the wireless signal used for determining the position information at Step S102 has already been registered in the region management information 22A.

When the tag ID has not been registered in the region management information 22A (No at Step S104), the processing proceeds to Step S106. At Step S106, the determination unit 20A registers, in the region management information 22A, the position information determined at Step S102 and the tag ID included in the wireless signal used for determining the position information in association with each other (Step S106).

In this case, the determination unit 20A registers, in the region management information 22A, "presence" as information representing the presence/absence of position movement corresponding to the tag ID. For example, the determination unit 20A registers, as a communication frequency ID corresponding to the tag ID, a communication frequency ID corresponding to the highest communication frequency registered in the communication frequency management information 22B (for example, communication frequency ID "b" in FIG. 3B). The determination unit 20A may register, as a communication frequency ID corresponding to the tag ID, a communication frequency ID (for example, communication frequency ID "z" in FIG. 3B) corresponding to the communication frequency serving as the initial value. The processing returns to Step S100.

Next, the judgement unit 20B judges, based on the position information determined at Step S102, whether position movement of the wireless communication device 14 is absent or not (Step S108). As described above, the judgement unit 20B performs the judgement at Step S108 by determining whether the position information corresponding to the tag ID included in the wireless signal received at Step S100 in the region management information 22A matches the position information determined at Step S102.

When it is determined at Step S108 that the position movement is absent (Yes at Step S108), the processing proceeds to Step S110. The judgement unit 20B updates the presence/absence of the position movement in the region management information 22A, which corresponds to the tag ID included in the wireless signal received at Step S100, to "absence" (Step S110).

Next, the judgement unit 20B judges whether the position movement of all wireless communication devices 14 within the target region P is "absence" (Step S112). The judgement unit 20B performs the judgement at Step S112 by determining whether the presence/absence of position movement corresponding to all tag IDs included in the region management information 22A indicates "absence".

When it is determined that the position movement of all the wireless communication devices 14 within the target region P is not absent but the position movement of part of the wireless communication devices 14 is present (No at Step S112), the processing proceeds to Step S114.

At Step S114, the transmission control unit 20C determines whether the decrease instruction signal has already been transmitted in the past to a wireless communication device 14 identified by the tag ID included in the wireless signal received at Step S100 (Step S114). The transmission control unit 20C performs the determination of Step S114 by determining whether a transmission time has been registered in a field of the decrease instruction signal transmission time corresponding to the tag ID in the region management information 22A.

When it is determined that the decrease instruction signal has not already been transmitted in the past (No at Step S114), the processing proceeds to Step S116. At Step S116, the transmission control unit 20C transmits a decrease instruction signal to the wireless communication device 14 whose position movement has been judged to be absent at Step S108 (Step S116). The transmission control unit 20C may transmit a decrease instruction signal including a communication frequency lower than a communication frequency identified by a communication frequency ID corresponding to the tag ID in the region management information 22A.

The transmission control unit 20C updates the communication frequency ID and the decrease instruction signal transmission time in the region management information 22A (Step S118). At Step S118, the transmission control unit 20C registers the communication frequency ID corresponding to the communication frequency included in the decrease instruction signal transmitted at Step S116 and the transmission time of the decrease instruction signal in the region management information 22A in association with the tag ID included in the wireless signal received at Step S100. Through the registration processing, the transmission control unit 20C updates the communication frequency ID and the transmission time.

Next, the control unit 20 determines whether to terminate the information processing (Step S120). For example, the control unit 20 makes the determination at Step S120 by determining whether a termination instruction signal input by a user's operation instruction has been received. When the control unit 20 makes positive determination at Step S120 (Yes at Step S120), this routine is terminated. On the other hand, when the control unit 20 makes negative determination at Step S120 (No at Step S120), the processing returns to Step S100 described above.

At Step S114 described above, when it is determined that the decrease instruction signal has already been transmitted in the past (Yes at Step S114), the processing proceeds to Step S122.

At Step S122, the transmission control unit 20C determines whether a predetermined time has elapsed from the previous transmission of the decrease instruction signal to the wireless communication device 14 whose position movement has been judged to be absent at Step S108 (Step S122). Specifically, the transmission control unit 20C determines whether the elapsed time from a decrease instruction signal transmission time in the region management information 22A corresponding to the tag ID received at Step S100 until the current time has exceeded a predetermined time. The predetermined time is, for example, 1 hour, but is not limited to this value.

When it is determined that the elapsed time has not exceeded the predetermined time (No at Step S122), the processing proceeds to Step S120 described above. When it is determined that the elapsed time has exceeded the predetermined time (Yes at Step S122), the processing proceeds to Step S124.

At Step S124, the transmission control unit 20C determines a communication frequency that is lower than a communication frequency previously transmitted to the wireless communication device 14 (Step S124). Specifically, the transmission control unit 20C determines, from the communication frequency management information 22B, a communication frequency lower than a communication frequency identified by a communication frequency ID corresponding to a tag ID included in the wireless signal received at Step S100 in the region management information 22A.

The transmission control unit 20C transmits a decrease instruction signal including the communication frequency determined at Step S124 to the wireless communication device 14 whose position movement has been judged to be absent at Step S108 (Step S126).

Next, the transmission control unit 20C updates the communication frequency ID and the decrease instruction signal transmission time in the region management information 22A (Step S128). At Step S128, the transmission control unit 20C registers a communication frequency ID corresponding to the communication frequency included in the decrease instruction signal transmitted at Step S126 and a transmission time of the decrease instruction signal in association with each other in the region management information 22A, in association with the tag ID included in the wireless signal received at Step S100. Through the registration processing, the transmission control unit 20C updates the communication frequency ID and the transmission time. The processing proceeds to Step S120 described above.

On the other hand, when it is determined at Step S112 described above that position movement of all wireless communication devices 14 within the target region P is absent (Yes at Step S122), the processing proceeds to Step S130.

At Step S130, the transmission control unit 20C determines whether the number of wireless communication devices 14 within the target region P has increased or decreased (Step S130). Specifically, the transmission control unit 20C counts the number of tag IDs registered in the region management information 22A when it has been determined at Step S112 that all pieces of the position movement information in the region management information 22A are "absence". The transmission control unit 20C also counts the number of tag IDs when all pieces of the position movement information in the region management information 22A has become absent last time. The transmission control unit 20C makes the determination at Step S130 by determining whether the determined numbers of tag IDs match each other. When the numbers of tag IDs match each other, the transmission control unit 20C determines that the number of wireless communication devices 14 within the target region P has neither increased nor decreased.

When it is determined that the number of wireless communication devices 14 within the target region P has neither increased nor decreased (No at Step S130), the processing proceeds to Step S132.

The transmission control unit 20C transmits a decrease instruction signal to all wireless communication devices 14 within the target region P (Step S132). At Step S132, the transmission control unit 20C transmits, to each of all wireless communication devices 14 within the target region P, a decrease instruction signal including a communication frequency lower than a communication frequency currently set in each of the wireless communication devices 14.

Specifically, the transmission control unit 20C determines, for each of a plurality of tag IDs registered in the region management information 22A, a communication frequency lower than a communication frequency identified by a corresponding communication frequency ID from the communication frequency management information 22B. The transmission control unit 20C transmits a decrease instruction signal including a communication frequency determined for each tag ID to the wireless communication device 14 identified by each of tag IDs registered in the region management information 22A.

Next, the transmission control unit 20C updates the communication frequency ID and the decrease instruction signal transmission time in the region management information 22A (Step S134). At Step S134, the transmission control unit 20C registers a communication frequency ID corresponding to a communication frequency included in a corresponding decrease instruction signal transmitted at Step S132 and the transmission time of the decrease instruction signal in association with each of all tag IDs registered in the region management information 22A. Through the registration processing, the transmission control unit 20C updates the communication frequency ID and the transmission time. The processing proceeds to Step S120 described above.

On the other hand, when it is determined at Step S130 that the number has increased or decreased (Yes at Step S130), the processing proceeds to Step S136. At Step S136, the transmission control unit 20C determines whether at least part of the wireless communication devices 14 within the target region P has been replaced (Step S136).

Specifically, the transmission control unit 20C determines tag IDs registered in the region management information 22A, which are obtained when it is determined at Step S112 that all pieces of the position movement information in the region management information 22A are "absence". The transmission control unit 20C also determines tag IDs which are obtained when all pieces of the position movement information in the region management information 22A have become absent last time. The transmission control unit 20C makes the determination at Step S136 by determining whether the determined tag IDs match each other. When those tag IDs match each other, it is determined that the replacement has not occurred. When it is determined that at least part of the wireless communication devices 14 within the target region P has not been replaced (No at Step S136), the processing proceeds to Step S132 described above. On the other hand, when it is determined that the replacement has occurred (Yes at Step S136), the processing proceeds to Step S120 described above.

On the other hand, when it is determined at Step S108 described above that the position movement is present (No at Step S108), the judgement unit 20B registers the position information determined at Step S102 in the region management information 22A in association with the tag ID included in the wireless signal received at Step S100 (Step S138). Through the processing at Step S138, the position information on the wireless communication device 14, which has moved its position in the region management information 22A, is updated.

Next, the transmission control unit 20C determines whether a decrease instruction signal has already been transmitted in the past to a wireless communication device 14 identified by the tag ID included in the wireless signal received at Step S100 (Step S140). The transmission control unit 20C determines whether the decrease instruction signal has already been transmitted by determining whether a transmission time has been registered in a field of the decrease instruction signal transmission time corresponding to the tag ID in the region management information 22A.

When it is determined that the decrease instruction signal has not already been transmitted in the past (No at Step S140), the processing proceeds to Step S120 described above.

On the other hand, when it is determined that the decrease instruction signal has already been transmitted in the past (Yes at Step S140), the processing proceeds to Step S142.

At Step S142, the transmission control unit 20C transmits an initial value instruction signal to a wireless communication device 14 determined at Step S108 to have moved its position (Step S142). The transmission control unit 20C may transmit an initial value instruction signal including a communication frequency indicating an initial value registered in the communication frequency management information 22B. Thus, the transmission control unit 20C can transmit, to the wireless communication device 14 whose communication frequency has been decreased due to the determination that the position movement is absent, the initial value instruction signal when it is determined that the position movement is present.

The transmission control unit 20C updates information in the region management information 22A that indicates the presence/absence of position movement corresponding to the tag ID of the wireless communication device 14 to which the initial value instruction signal is transmitted at Step S142 to "presence" (Step S144). The transmission control unit 20C registers a communication frequency ID (for example, communication frequency ID "z") corresponding to the communication frequency indicating the initial value as the communication frequency ID corresponding to the tag ID in the region management information 22A, and registers the initial value instruction signal transmission time at Step S142 as a decrease instruction signal transmission time. Through this processing, the transmission control unit 20C updates the communication frequency ID and the decrease instruction signal transmission time in the region management information 22A (Step S146). The processing proceeds to Step S120 described above.

Next, the flow of interrupt processing executed by the position determination apparatus 10 will be described.

Figure 5:
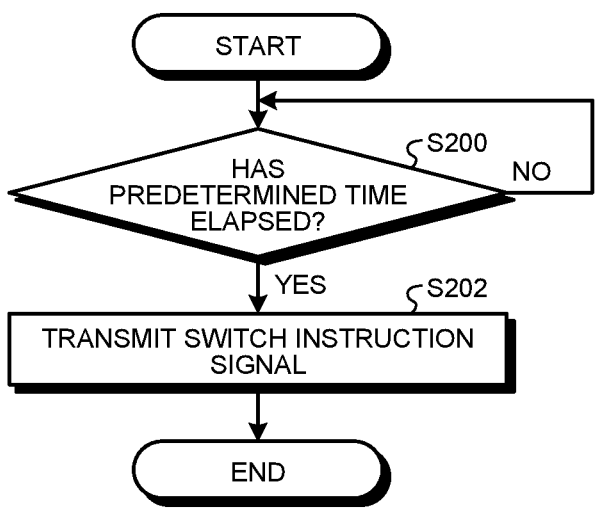
FIG. 5 is a flowchart illustrating an example of the flow of interrupt processing according to the embodiment.

FIG. 5 is a flowchart illustrating an example of the flow of interrupt processing executed by the position determination apparatus 10. The judgement unit 20B judges whether the current time has reached a predetermined time (Step S200). Until positive judgement is made at Step S200 (Yes at Step S200), the transmission control unit 20C repeats negative judgement (No at Step S200).

When positive judgement is made at Step S200 (Yes at Step S200), the processing proceeds to Step S202. At Step S202, the transmission control unit 20C transmits the switch instruction signal to all wireless communication devices 14 within the target region P (Step S202). The transmission control unit 20C may transmit the switch instruction signal to a wireless communication device 14 identified by each of all tag IDs registered in the region management information 22A. After that, this routine is terminated.

Next, a sequence of information processing executed by the position determination system 1 in the present embodiment will be described.

Figure 6:
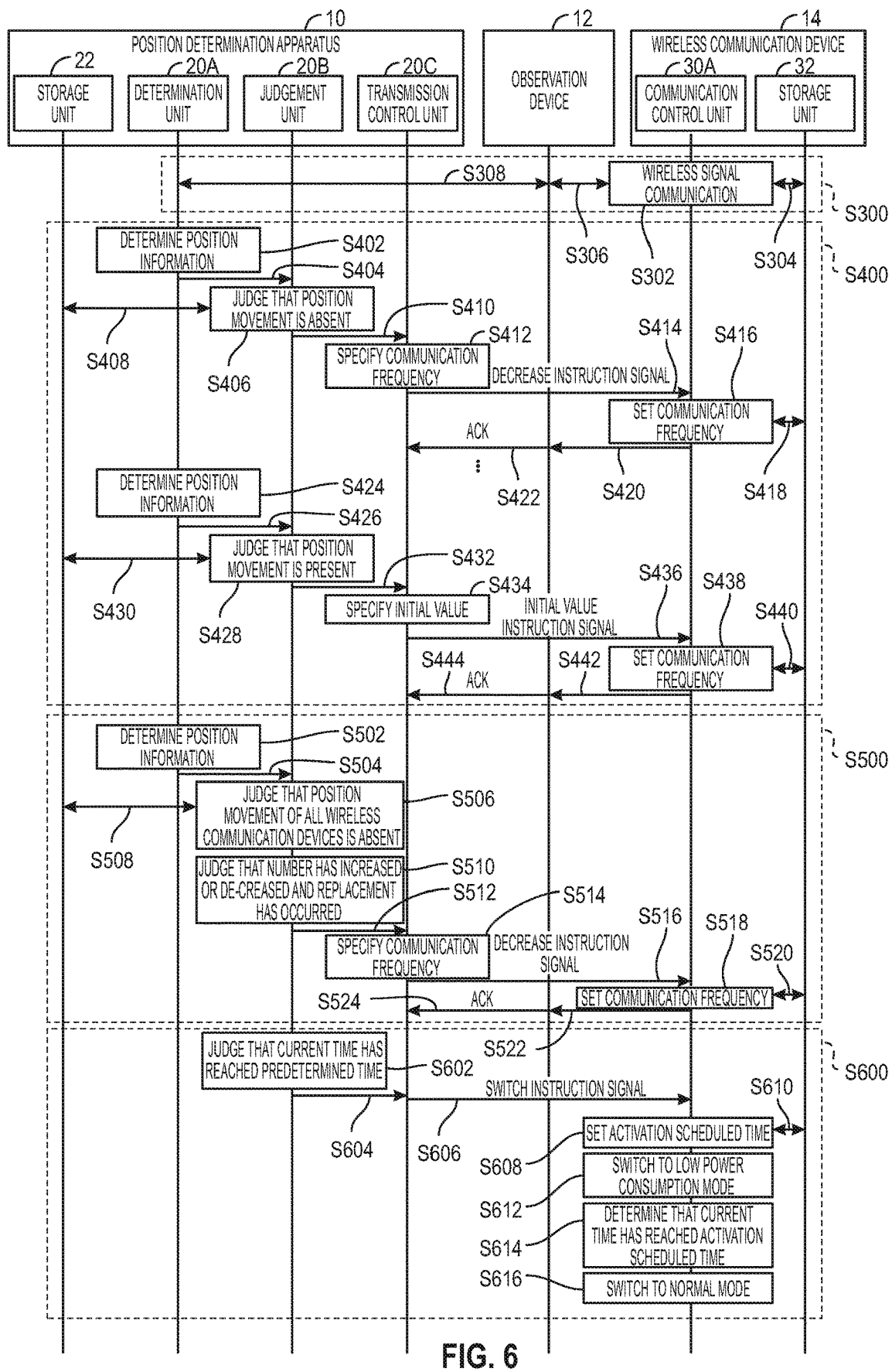
FIG. 6 is a sequence diagram illustrating an example of the flow of information processing according to the embodiment.

FIG. 6 is a sequence diagram illustrating an example of the processing of information processing executed by the position determination system 1 in the present embodiment.

The communication control unit 30A in the wireless communication device 14 communicates at a communication frequency currently set (Step S300).

Specifically, the communication control unit 30A in the wireless communication device 14 receives signals transmitted from the position determination apparatus 10 or the observation device 12 and transmits wireless signals (Step S306, Step S308) at a communication frequency corresponding to the one stored in the storage unit 32 (Step S302, Step S304).

The control unit 20 in the position determination apparatus 10 transmits a decrease instruction signal and transmits an initial value instruction signal depending on the determination result of the presence/absence of position movement of the wireless communication device 14 (Step S400).

Specifically, the determination unit 20A in the position determination apparatus 10 determines position information on the wireless communication device 14 being a transmission source of the wireless signal by using a wireless signal received from the wireless communication device 14 via the observation device 12 (Step S402). When the judgement unit 20B receives the position information from the determination unit 20A (Step S404), the judgement unit 20B determines position movement of the wireless communication device 14 by using the region management information 22A in the storage unit 22 (Steps S406 and S408). The description is continued on the assumption that the judgement unit 20B judges that the position movement is absent. When it is determined that the position movement is absent (Step S410), the transmission control unit 20C determines a communication frequency lower than the communication frequency currently set in the wireless communication device 14 (Step S412).

The transmission control unit 20C transmits, via the observation device 12, a decrease instruction signal including the communication frequency determined at Step S412 to the wireless communication device 14 whose position movement has been judged to be absent (Step S414).

The communication control unit 30A in the wireless communication device 14, whose position movement has been judged to be absent, stores the communication frequency included in the decrease instruction signal received at Step S414 in the storage unit 32, thereby updating the communication frequency (Steps S416 and S418). Thus, in the subsequent processing, the wireless communication device 14 performs communication (transmission and reception) with other devices at a communication frequency lower than that before the decrease instruction signal is received.

The communication control unit 30A in the wireless communication device 14 sends a positive response signal (for example, Acknowledgement (ACK)) as a signal representing completion of setting (Step S420, Step S422).

When the ACK is received, the transmission control unit 20C in the position determination apparatus 10 completes the transmission of the decrease instruction signal including the communication frequency determined at Step S412 to the wireless communication device 14.

It is assumed that, after a predetermined time has elapsed from the transmission of the decrease instruction signal to the wireless communication device 14 at Step S414, the judgement unit 20B judges again that the position movement of the wireless communication device 14 is absent. In this case, the position determination apparatus 10, the observation device 12, and the wireless communication device 14 execute the processing from Step S402 to Step S422 again.

Thus, the communication frequency of the wireless communication device 14, whose position movement has been judged to be absent, can be gradually decreased.

On the other hand, it is assumed that the determination unit 20A newly determines position information on the wireless communication device 14 to which the decrease instruction signal has been transmitted at Step S414 (Step S424). In this case, when the judgement unit 20B receives the position information from the determination unit 20A (Step S426), the judgement unit 20B judges the position movement of the wireless communication device 14 by using the region management information 22A in the storage unit 22 (Steps S428 and S430). The description is continued on the assumption that the judgement unit 20B judges that the position movement is present. When it is determined that the position movement is present (Step S432), the transmission control unit 20C determines an initial value of the communication frequency from the communication frequency management information 22B (Step S434).

The transmission control unit 20C transmits, via the observation device 12, an initial value instruction signal including the communication frequency determined at Step S434 to the wireless communication device 14 whose position movement has been judged to be present at Step S428 (Step S436).

The communication control unit 30A in the wireless communication device 14, whose position movement has been judged to be present after determined that the position movement is absent, stores in the storage unit 32 the communication frequency included in the initial value instruction signal received at Step S436, thereby setting the communication frequency to the initial value (Steps S438 and S440). Thus, the wireless communication device 14, whose communication frequency has been decreased due to the determination that the position movement is absent, can perform communication (transmission and reception) with other devices at a communication frequency having the initial value when it is determined that the position movement is present.

Then, the communication control unit 30A in the wireless communication device 14 sends a positive response signal (for example, ACK) as a signal representing the completion of setting (Steps S442 and S444).

When the ACK is received, the transmission control unit 20C in the position determination apparatus 10 completes the transmission of the initial value instruction signal to the wireless communication device 14.

Accordingly, when the position movement of the wireless communication device 14 in the target region P is judged to be absent, the wireless communication device 14 receives the decrease instruction signal, and after that, communicates at a communication frequency lower than the currently set communication frequency. Thus, the wireless communication device 14 can reduce power consumption. Furthermore, when the position movement of the wireless communication device 14, which has communicated at a low communication frequency due to the determination that the position movement is absent, is newly judged to be present, this device 14 receives the initial value instruction signal, and after that, communicates at a communication frequency having the initial value. Thus, when the wireless communication device 14 restarts the position movement, the wireless communication device 14 restarts the communication at a communication frequency higher than the decreased communication frequency. Consequently, the wireless communication device 14 can suppress power consumption and communicate at a communication frequency that causes no problem in the operation.

When it is determined that the position movement of all wireless communication devices 14 within the target region P is absent, the control unit 20 in the position determination apparatus 10 transmits a decrease instruction signal to all the wireless communication devices 14 within the target region P (Step S500).

Specifically, the determination unit 20A in the position determination apparatus 10 determines position information on the wireless communication device 14 being a transmission source of the wireless signal by using a wireless signal received from a wireless communication device 14 via the observation device 12 (Step S502). When the judgement unit 20B receives the position information from the determination unit 20A (Step S504), the judgement unit 20B judges, by using the region management information 22A in the storage unit 22, whether the position movement of all wireless communication devices 14 within the target region P is absent (Step S506, Step S508). The description is continued on the assumption that it is determined that the position movement of all wireless communication devices 14 within the target region P is absent.

The transmission control unit 20C determines whether the number of the wireless communication devices 14 within the target region P has neither increased nor decreased, and determines whether at least part of the wireless communication devices 14 included in the target region P has not been replaced (Step S510). The description is continued on the assumption that the transmission control unit 20C determines that the number of the wireless communication devices 14 within the target region P has neither increased nor decreased, and determines that at least part of the wireless communication devices 14 included in the target region P has not been replaced. The transmission control unit 20C determines, for each of all the wireless communication devices 14 present within the target region P, a communication frequency lower than the currently set communication frequency (Steps S512 and S514).

Then, the transmission control unit 20C transmits, via the observation device 12, a decrease instruction signal including the communication frequency determined at Step S514 to all the wireless communication devices 14 within the target region P (Step S516).

The communication control units 30A in each of all the wireless communication devices 14 within the target region P stores, in the storage unit 32, the communication frequency included in the decrease instruction signal received at Step S516, thereby setting the communication frequency (Steps S518 and S520). Thus, when it is determined that the position movement of all the wireless communication devices 14 within the target region P is absent and it is determined that the number of the wireless communication devices 14 within the target region P has neither increased nor decreased and the replacement has not occurred, all the wireless communication devices 14 present within the target region P perform communication (transmission and reception) with other devices at a communication frequency lower than that before the decrease instruction signal is received in the subsequent processing.

The communication control unit 30A in the wireless communication device 14 sends a positive response signal (for example, ACK) as a signal representing the completion of setting (Steps S522 and S524).

When the ACKs are received from all the wireless communication devices 14 within the target region P, the transmission control unit 20C in the position determination apparatus 10 completes the transmission of the initial value instruction signal transmitted at Step S436.

Thus, when it is determined that the position movement of all the wireless communication devices 14 within the target region P is absent and the increase or decrease in number thereof and the replacement have not occurred, each of all the wireless communication devices 14 within the target region P receives the decrease instruction signal and communicates at a communication frequency lower than the currently set communication frequency. Consequently, the wireless communication device 14 can reduce power consumption.

Similarly to the foregoing processing at Step S400, when it is determined that the position movement of the wireless communication device 14 that has communicated at a low communication frequency due to the determination that the position movement is absent is present, the wireless communication device 14 may receive an initial value instruction signal and communicate at a communication frequency having the initial value.

When the current time has reached a predetermined time, the control unit 20 in the position determination apparatus 10 transmits a switch instruction signal to all the wireless communication devices 14 within the target region P (Step S600).

Specifically, the judgement unit 20B in the position determination apparatus 10 judges that the current time has reached a predetermined time (Step S602).

When it is determined that the current time has reached the predetermined time (Step S604), the transmission control unit 20C transmits a switch instruction signal to all wireless communication devices 14 within the target region P via the observation device 12 (Step S606).

When the communication control unit 30A in the wireless communication device 14 receives the switch instruction signal, the communication control unit 30A sets an activation scheduled time included in the switch instruction signal to the storage unit 32 (Steps S608 and S610). Then, the communication control unit 30A is switched from the normal mode to the low power consumption mode (Step S612).

When the communication control unit 30A in the wireless communication device 14 determines that the current time has reached the activation scheduled time set at Step S608 (Step S614), the communication control unit 30A is switched from the low power consumption mode to the normal mode (Step S616).

As described above, the position determination apparatus 10 in the present embodiment includes the determination unit 20A, the judgement unit 20B, and the transmission control unit 20C. The determination unit 20A determines position information on one or more wireless communication devices 14 within a target region P. The judgement unit 20B judges the position movement of the wireless communication device 14 based on the position information. The transmission control unit 20C transmits, to the wireless communication device 14 whose position movement has been judged to be absent, a decrease instruction signal representing a decrease of a communication frequency of the wireless communication device 14.

Note that, conventionally, the communication frequency of a wireless communication device is set to a predetermined fixed value. Also, conventionally, communication frequency of the wireless communication device is physically changed by manipulating a switch mounted on a substrate or a casing of the wireless communication device. Thus, conventionally, the wireless communication device continues to communicate at the physically set communication frequency, so that it is difficult to reduce power consumption.

In contrast, the position determination apparatus 10 in the present embodiment transmits a decrease instruction signal representing a decrease of the communication frequency to a wireless communication device 14 whose position movement has been judged to be absent among the wireless communication devices 14 within the target region P. Thus, when the wireless communication device 14, whose position movement has been judged to be absent in the target region P, receives the decrease instruction signal, the communication frequency is decreased. Therefore, in the position determination apparatus 10 according to the present embodiment, the power consumption of the wireless communication device 14 can be reduced as compared with the case where the wireless communication device 14 continues to communicate at a fixed communication frequency.

Consequently, in the position determination apparatus 10 in the present embodiment, the power consumption of the wireless communication device 14 can be reduced.

The position determination apparatus 10 in the present embodiment enables the wireless communication device 14 to reduce power consumption. Thus, the power consumption rate of a power supply source to the wireless communication device 14, such as a battery, can be reduced to prolong the lifetime of power of the power supply source. This is because the position determination apparatus 10 enables the position determination apparatus 10 to change the setting of the communication frequency in accordance with the position movement of the wireless communication device 14, instead of a simplistic method such as increase of the battery capacity. Therefore, in the present embodiment, when the position of the wireless communication device 14 varies, the power of the wireless communication device 14 can be easily prolonged in accordance with environmental changes such as the position variation of the wireless communication device 14.

Furthermore, the transmission control unit 20C transmits a decrease instruction signal representing a gradual decrease of the communication frequency to the wireless communication device 14 whose position movement has been judged to be absent. That is, the decrease instruction signal is transmitted such that the power consumption of the wireless communication device 14 gradually decreases in accordance with environmental changes of the wireless communication device 14 caused by the position movement of the wireless communication device 14. Thus, the position determination apparatus 10 can reduce the power consumption of the wireless communication device 14 in accordance with the environmental changes of the wireless communication device 14.

Furthermore, when it is determined that the position movement of the wireless communication device 14, to which the decrease instruction signal has been transmitted, is present, the transmission control unit 20C transmits an initial value instruction signal that causes the wireless communication device 14 to return a value of the communication frequency to the initial value. In this manner, when the position movement has occurred in the wireless communication device 14 whose communication frequency has been decreased due to the determination that the position movement is absent, the position determination apparatus 10 transmits, to the wireless communication device 14, the initial value instruction signal for returning a value of the communication frequency to the initial value. Therefore, the position determination apparatus 10 can reduce the power consumption in accordance with environmental changes of the wireless communication device 14 without hindering the communication function of the wireless communication device 14 for various kinds of signals.

Furthermore, when a plurality of wireless communication devices 14 are included in the target region P and it is determined that the position movement of all the wireless communication devices 14 within the target region P is absent, the transmission control unit 20C transmits a decrease instruction signal to all the wireless communication devices 14 within the target region P.

Thus, the position determination apparatus 10 can efficiently reduce the power consumption of the wireless communication devices 14 within the target region P.

Furthermore, when it is determined that the position movement of all wireless communication devices 14 within the target region P is absent and at least one of the first and second conditions is satisfied, the transmission control unit 20C transmits a decrease instruction signal to all the wireless communication devices 14 within the target region P. The first condition is a condition where it is determined that the number of the wireless communication devices 14 within the target region P has neither increased nor decreased. The second condition is a condition where it is determined that at least part of the wireless communication devices 14 within the target region P has not been replaced. Therefore, the position determination apparatus 10 can efficiently reduce the power consumption of the wireless communication devices 14 within the target region P in accordance with environmental changes of the wireless communication device 14.

Furthermore, when the current time has reached a predetermined time, the transmission control unit 20C transmits, to all wireless communication devices 14 within the target region P, a switch instruction signal including switch instruction for switching from the normal mode to the low power consumption mode in which power consumption is lower than that in the normal mode and a resume instruction for resuming to the normal mode when the current time has reached an activation scheduled time after the normal mode is switched to the low power consumption mode.

Consequently, the position determination apparatus 10 can efficiently reduce the power consumption of the wireless communication devices 14 within the target region P. Furthermore, the position determination system 1 includes the wireless communication device 14 and the position determination apparatus 10 that communicates with the wireless communication device 14. The position determination apparatus 10 includes the determination unit 20A, the judgement unit 20B, and the transmission control unit 20C. The determination unit 20A determines position information on one or more wireless communication devices 14 within a target region P. The judgement unit 20B judges position movement of the wireless communication device 14 based on the position information. The transmission control unit 20C transmits, to a wireless communication device 14 whose position movement has been judged to be absent, a decrease instruction signal representing a decrease of the communication frequency of the wireless communication device 14.

Thus, power consumption in the wireless communication device 14 can be reduced.

Hardware Configuration

Figure 7:
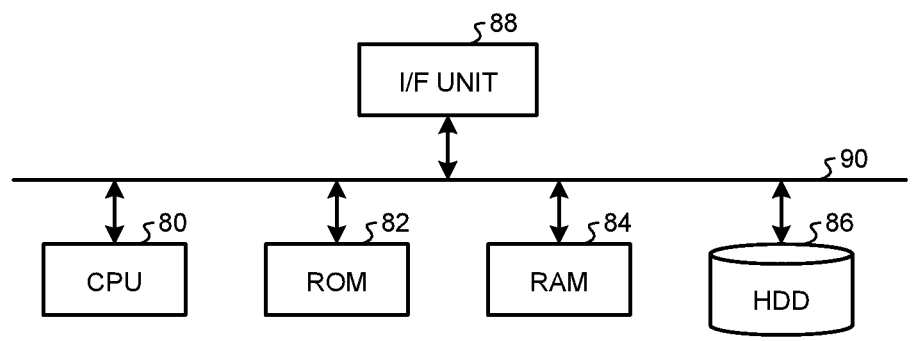
FIG. 7 is a hardware configuration diagram of a position determination apparatus, an observation device, and a wireless communication device according to the embodiment.

Next, an example of the hardware configuration of the position determination apparatus 10, the observation device 12, and the wireless communication device 14 in the above-mentioned embodiment will be described. FIG. 7 is a diagram illustrating an example of a hardware configuration diagram of the position determination apparatus 10, the observation device 12, and the wireless communication device 14.

The position determination apparatus 10, the observation device 12, and the wireless communication device 14 each include a control device such as a CPU 80, storage devices such as a read only memory (ROM) 82, a random access memory (RAM) 84, and a hard disk drive (HDD) 86, an I/F unit 88 as an interface for various kinds of devices, and a bus 90 for connecting the units, and have a hardware configuration using a general computer.

In the position determination apparatus 10, the observation device 12, and the wireless communication device 14, the CPU 80 reads a computer program from the ROM 82 onto the RAM 84 and executes the computer program, and thereby each of the above-mentioned units is implemented on the computer.

Computer programs for executing each piece of the above-mentioned processing executed by the position determination apparatus 10, the observation device 12, and the wireless communication device 14 may be stored in the HDD 86. Computer programs for executing each piece of the above-mentioned processing executed by the position determination apparatus 10, the observation device 12, and the wireless communication device 14 may be provided by being stored in the ROM 82 in advance.

Computer programs for executing the above-mentioned processing executed by the position determination apparatus 10, the observation device 12, and the wireless communication device 14 may be stored in a computer-readable storage medium, such as a CD-ROM, a CD-R, a memory card, a digital versatile disc (DVD), and a flexible disk (FD), as a file in an installable format or an executable format, and provided as a computer program product. Computer programs for executing the above-mentioned processing executed by the position determination apparatus 10, the observation device 12, and the wireless communication device 14 may be stored on a computer connected to a network such as the Internet, and provided by being downloaded over the network. Computer programs for executing the above-mentioned processing executed by the position determination apparatus 10, the observation device 12, and the wireless communication device 14 may be provided or distributed over network such as the Internet.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A position determination apparatus comprising:
a memory; and
a hardware processor that is coupled to the memory and that:
determines position information on two or more wireless communication devices being located within a target region;
judges position movement of the two or more wireless communication devices based on the position information; and
transmits, to the wireless communication device whose position movement has been judged to be absent, a decrease instruction signal that causes the wireless communication device to decrease a communication frequency of the wireless communication device, wherein
the hardware processor transmits the decrease instruction signal to all the two or more wireless communication devices within the target region when
it is determined that position movement of all the two or more wireless communication devices within the target region is absent, and
at least one of first and second conditions is satisfied, the first condition being a condition where it is determined that a number of the two or more wireless communication devices within the target region has neither increased nor decreased, the second condition being a condition where it is determined that at least part of the two or more wireless communication devices within the target region has not been replaced.

2. The position determination apparatus according to claim 1, wherein the hardware processor transmits the decrease instruction signal representing a gradual decrease in the communication frequency.

3. The position determination apparatus according to claim 1, wherein, when it is determined that position movement of the wireless communication device is present after the decrease instruction signal is transmitted to the wireless communication device, the hardware processor transmits, to the wireless communication device, an initial value instruction signal that causes the wireless communication device to return the communication frequency to an initial value.

4. The position determination apparatus according to claim 1, wherein, when a current time has reached a predetermined time, the hardware processor transmits, to all the wireless communication devices within the target region, a switch instruction signal that includes
a switch instruction to switch a normal mode to a low power consumption mode in which power consumption is lower than power consumption in the normal mode, and
a resume instruction to resume to the normal mode when a current time has reached an activation scheduled time after the normal mode is switched to the low power consumption mode.

5. A position determination system comprising:
two or more wireless communication devices; and
a position determination apparatus that comprises:
a memory; and
a hardware processor that is coupled to the memory and that is configured to:
determine position information on the two or more the wireless communication devices being located within a target region;
judge position movement of the two or more wireless communication devices based on the position information; and
transmit, to the wireless communication device whose position movement has been judged to be absent, a decrease instruction signal that causes the wireless communication device to decrease a communication frequency of the wireless communication device, wherein
the hardware processor transmits the decrease instruction signal to all the two or more wireless communication devices within the target region when
it is determined that position movement of all the two or more wireless communication devices within the target region is absent, and
at least one of first and second conditions is satisfied, the first condition being a condition where it is determined that a number of the two or more wireless communication devices within the target region has neither increased nor decreased, the second condition being a condition where it is determined that at least part of the two or more wireless communication devices within the target region has not been replaced.

6. A non-transitory computer-readable recording medium comprising a computer program including programmed instructions that, when executed by a computer, causes the computer to perform:
determining position information on two or more wireless communication devices being located within a target region;
judging position movement of the two or more wireless communication devices based on the position information; and
transmitting, to the wireless communication device whose position movement has been judged to be absent, a decrease instruction signal that causes the wireless communication device to decrease a communication frequency of the wireless communication device wherein
the transmitting comprises transmitting the decrease instruction signal to all the two or more wireless communication devices within the target region when
it is determined that position movement of all the two or more wireless communication devices within the target region is absent, and
at least one of first and second conditions is satisfied, the first condition being a condition where it is determined that a number of the two or more wireless communication devices within the target region has neither increased nor decreased, the second condition being a condition where it is determined that at least part of the two or more wireless communication devices within the target region has not been replaced.

* * * * *